(12) United States Patent
Tran

(10) Patent No.: US 11,971,677 B2
(45) Date of Patent: Apr. 30, 2024

(54) SHEET FEEDER CAPABLE OF DETERMINING SHEET SIZE BASED ON TRAVEL DISTANCES OF PAIR OF SIDE PLATES AND IMAGE FORMING APPARATUS

(71) Applicant: KYOCERA Document Solutions Inc., Osaka (JP)

(72) Inventor: Trung Manh Tran, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/122,734

(22) Filed: Mar. 17, 2023

(65) Prior Publication Data

US 2023/0305472 A1    Sep. 28, 2023

(30) Foreign Application Priority Data

Mar. 22, 2022  (JP) ................................ 2022-045764

(51) Int. Cl.
*G03G 15/00*     (2006.01)
*B65H 1/04*      (2006.01)
*B65H 1/14*      (2006.01)
*G06K 15/16*     (2006.01)

(52) U.S. Cl.
CPC .......... *G03G 15/6511* (2013.01); *B65H 1/04* (2013.01); *B65H 1/14* (2013.01); *G06K 15/16* (2013.01); *B65H 2405/1144* (2013.01); *B65H 2511/12* (2013.01)

(58) Field of Classification Search
CPC ........ G03G 15/6511; B65H 1/04; B65H 1/14; B65H 2405/1144; B65H 2511/12; G06K 15/16

See application file for complete search history.

(56) References Cited

U.S. PATENT DOCUMENTS 5,360,207 A * 11/1994 Rauen ...................... B65H 1/04
                                                      271/265.02
2012/0049442 A1 * 3/2012 Sekiguchi ................ B65H 7/02
                                                      271/145

(Continued)

FOREIGN PATENT DOCUMENTS

JP     2001151382 A    6/2001
JP     2002244500 A    8/2002

*Primary Examiner* — David H Banh
(74) *Attorney, Agent, or Firm* — IP Business Solutions, LLC

(57) ABSTRACT

A sheet feeder includes: a sheet rack; a pair of side plates movable along a width of a sheet on the sheet rack and abuttable against both widthwise ends of the sheet; a widthwise drive device that moves the side plates along the width of the sheet; a pair of end detecting devices provided one for each of the side plates and capable of detecting both the ends of the sheet abutting the side plates, respectively; and a control device that includes a processor, controls the widthwise drive device through the processor executing a control program to allow the widthwise drive device to move, based on outputs of the end detecting devices, the side plates until abutment against both the ends of the sheet, acquires respective travel distances of the side plates moved by the widthwise drive device, and determines a size of the sheet based on the travel distances.

5 Claims, 19 Drawing Sheets

(56) References Cited

U.S. PATENT DOCUMENTS

| | | | | |
|---|---|---|---|---|
| 2013/0106049 A1* | 5/2013 | Sato | ........................ | B65H 1/04 |
| | | | | 271/164 |
| 2013/0214483 A1* | 8/2013 | Hirahara | .................. | B65H 1/00 |
| | | | | 271/147 |
| 2013/0243448 A1* | 9/2013 | Naoi | ........................ | B65H 1/18 |
| | | | | 399/23 |
| 2013/0341854 A1* | 12/2013 | Miyakawa | ............... | B65H 7/02 |
| | | | | 271/145 |

* cited by examiner

Fig.17

| STANDARD SIZE | WIDTH ± Δx |
|---|---|
|  |  |
| A5 | 148±5(mm) |
| B5 | 182±5(mm) |
| A4 | 210±5(mm) |
| B4 | 257±5(mm) |

DT

SHEET FEEDER CAPABLE OF DETERMINING SHEET SIZE BASED ON TRAVEL DISTANCES OF PAIR OF SIDE PLATES AND IMAGE FORMING APPARATUS

INCORPORATION BY REFERENCE

This application claims priority to Japanese Patent Application No. 2022-045764 filed on 22 Mar. 2022, the entire contents of which are incorporated by reference herein.

BACKGROUND

The present disclosure relates to sheet feeders that accommodates and feeds a plurality of sheets, and image forming apparatuses including the sheet feeders. Particularly, the present disclosure relates to a technique for aligning both ends of the sheets and detecting the size of the sheets.

An image forming apparatus forms an image on a recording paper sheet (a sheet). The image forming apparatus receives feed of recording paper sheets from a sheet feeder. Generally, there is known a sheet feeder having the function of aligning both ends of the recording paper sheets and detecting the size of the recording paper sheets.

Furthermore, there is generally known a document reading device including a pair of guide plates provided spaced apart from each other in a widthwise direction of a sheet of original document. In the document reading device, the user manually moves the pair of guide plates to regulate the widthwise direction of the sheet of original document with the pair of guide plates. The document reading device is provided with a technique for detecting the travel distances of the pair of guide plates with sensors and detecting the width of the sheet of original document from the detected travel distances.

There is also generally known an image forming apparatus including a pair of alignment plates for regulating the widthwise direction of sheets. The image forming apparatus is provided with a technique in which the size of sheets accommodated in a sheet cassette is detected or input and the pair of alignment plates are moved by a motor according to the size of the sheets.

SUMMARY

A technique improved over the aforementioned techniques is proposed as one aspect of the present disclosure.

A sheet feeder according to an aspect of the present disclosure includes a sheet rack, a pair of side plates, a widthwise drive device, a pair of end detecting devices, and a control device. The pair of side plates is movable in a widthwise direction of a sheet loaded on the sheet rack and abuttable against both widthwise ends of the sheet. The widthwise drive device moves the pair of side plates in the widthwise direction of the sheet. The pair of end detecting devices are provided one for each of the pair of side plates and detect both the respective ends of the sheet abutting the pair of side plates, respectively. The control device includes a processor, controls the widthwise drive device through the processor executing a control program to allow the widthwise drive device to move, based on detected outputs of the pair of end detecting devices, the pair of side plates until abutment of the pair of side plates against both the ends of the sheet, acquires respective travel distances of the pair of side plates moved by the widthwise drive device, and determines a size of the sheet based on the travel distances of the pair of side plates.

An image forming apparatus according to another aspect of the present disclosure includes the above-described sheet feeder and an image forming device. The image forming device forms an image on the sheet fed from the sheet feeder.

BRIEF DESCRIPTION OF THE DRAWINGS

FIG. 17 conceptually shows a size data table.

DETAILED DESCRIPTION

Hereinafter, a description will be given of an embodiment of the present disclosure with reference to the drawings.

Figure 1:
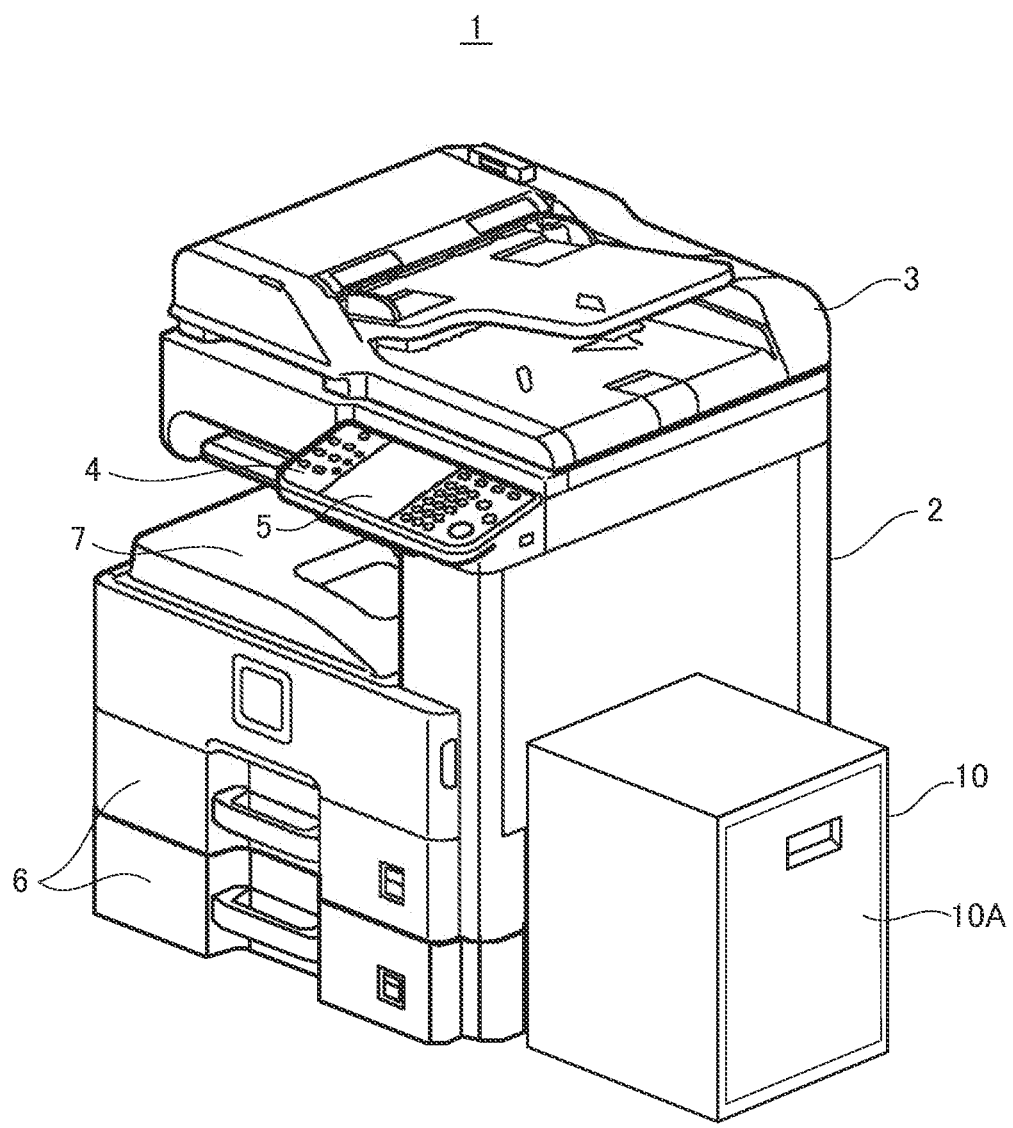
FIG. 1 is a perspective view showing the appearance of an image forming apparatus to which a sheet feeder according to an embodiment of the present disclosure is applied.

FIG. 1 is a perspective view showing the appearance of an image forming apparatus to which a sheet feeder according to an embodiment of the present disclosure is applied. As shown in FIG. 1, the image forming apparatus 1 is a multifunction peripheral. An apparatus body 2 of the image forming apparatus 1 is provided with a plurality of devices for use in realizing various functions of the image forming apparatus 1. For example, the apparatus body 2 is provided with an image reading device 3, an operation device 4, a display device 5, sheet feed cassettes 6, a sheet output tray 7, and so on. The apparatus body 2 is internally provided with an image forming device and a fixing device. A sheet feeder 10 according to this embodiment is attached to the apparatus body 2.

The image reading device 3 is an ADF (auto document feeder) including a document conveyance device and a scanner. The document conveyance device conveys an original document. The scanner optically reads an image of an original document being conveyed by the document conveyance device or an image of an original document placed on an original glass plate and generates image data representing the image of the original document.

Based on the image data input from the image reading device 3, the image forming device forms, by an electrophotographic system using a toner, an image of the original document on a recording paper sheet fed from a sheet feed cassette 6 or the sheet feeder 10. The recording paper sheet with the image formed thereon is subjected to fixation processing by the fixing device and is then discharged to the sheet output tray 7.

The operation device 4 includes, for example, a Start key, an Enter key for fixing input contents, numeric keys for inputting numeric values, and so on. The operation device 4 receives input of user's instructions on various types of operations and processing and so on. The operation device 4 is provided with the display device 5 that displays operation guidance and other types of information for the user.

Figure 2:
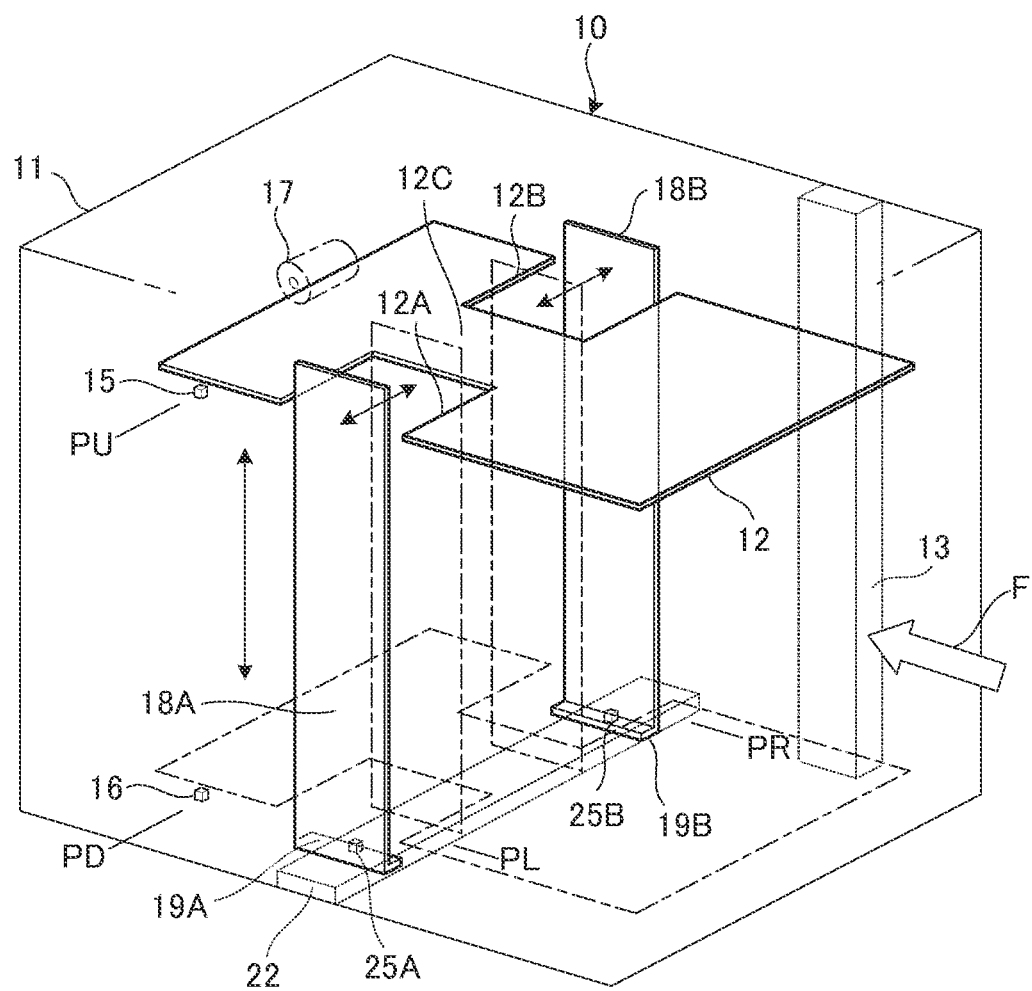
FIG. 2 is a perspective view schematically showing an internal structure of the sheet feeder.

FIG. 2 is a perspective view schematically showing an internal structure of the sheet feeder 10. As shown in FIG. 2, in the interior of a body housing 11 of the sheet feeder 10, a sheet rack 12 is vertically movably supported by rails or the like extending in a vertical direction. The sheet rack 12 is a plate-shaped member. The sheet rack 12 can be loaded with a plurality of recording paper sheets. The sheet rack 12 includes: a pair of cutaways 12A, 12B formed in portions thereof located under both the widthwise ends of the recording paper sheets loaded on the sheet rack 12; and a narrow portion 12C defined between the pair of cutaways 12A, 12B.

A lifting/lowering drive device 13 includes, for example, a pair of pulleys and a belt. The pair of pulleys are disposed apart from each other in the vertical direction. The belt is mounted around the pair of pulleys. The sheet rack 12 is connected to the belt. The lifting/lowering drive device 13 further includes a stepping motor as a drive source, a gear unit, and so on. The gear unit transmits rotation of an output shaft of the stepping motor to the pair of pulleys. The lifting/lowering drive device 13 drives one of the pair of pulleys into rotation, thus rotates the belt between the pair of pulleys, and thus moves the sheet rack 12 in the vertical direction.

The lifting/lowering drive device 13 moves the sheet rack 12 within a range of travel from an upper limit position PU to a lower limit position PD. An upper limit position detecting device 15 is disposed so that when the sheet rack 12 is positioned at the upper limit position PU, a side end of the sheet rack 12 faces the upper limit position detecting device 15. A lower limit position detecting device 16 is disposed so that when the sheet rack 12 is positioned at the lower limit position PD, the side end of the sheet rack 12 faces the lower limit position detecting device 16.

The upper limit position detecting device 15 is, for example, a reflective optical sensor including a light-emitting element and a light-receiving element. The upper limit position detecting device 15 detects the sheet rack 12 (or a recording paper sheet on the sheet rack 12) having reached the upper limit position PU by emitting light of the light-emitting element to the side end of the sheet rack 12 (or a side end of a recording paper sheet on the sheet rack 12) having reached the upper limit position PU and receiving reflected light from the side end. The lower limit position detecting device 16 is also a reflective optical sensor. The lower limit position detecting device 16 detects the sheet rack 12 having reached the lower limit position PD by emitting light of the light-emitting element to the side end of the sheet rack 12 having reached the lower limit position PD and receiving reflected light from the side end.

A sheet feed roller 17 is provided near to the front end of the sheet rack 12 (or a recording paper sheet on the sheet rack 12) having reached the upper limit position PU. The sheet feed roller 17 is driven into rotation while being pressed against an uppermost recording paper sheet on the sheet rack 12, thus pulling out the uppermost recording paper sheet from the sheet rack 12 and forwarding it toward the image forming device of the image forming apparatus 1.

A pair of side plates 18A, 18B are provided in the regions of the pair of cutaways 12A, 12B, respectively. Each of the pair of side plates 18A, 18B includes a vertically elongated plate-shaped portion and a ledge 19A, 19B bent from the bottom end of the plate-shaped portion toward the sheet rack 12. The plate-shaped portions are disposed to become parallel to both widthwise ends of recording paper sheets on the sheet rack 12. The pair of side plates 18A, 18B are supported, movably within the respective regions of the pair of cutaways 12A, 12B, on a rail or the like laid to extend in the widthwise direction of the recording paper sheets on the sheet rack 12.

A widthwise drive device 22 moves the pair of side plates 18A, 18B toward and away from each other (i.e., in the widthwise direction of the recording paper sheets on the sheet rack 12) in the regions of the pair of cutaways 12A, 12B. The widthwise drive device 22 includes, for example, a pair of rack gears and a pinion gear. The pair of rack gears are connected to the pair of side plates 18A and 18B, respectively, and extend inwardly of the pair of side plates 18A, 18B. The pair of rack gears are disposed in parallel with each other. The pinion gear is interposed between the pair of rack gears and meshes with both the rack gears. When the pinion gear is driven into rotation, the pair of rack gears move in different directions from each other and, thus, the pair of side plates 18A, 18B move toward and away from each other.

Alternatively, the widthwise drive device 22 includes, for example, a lateral screw and a pair of internal screws. The lateral screw is designed to extend from one side plate 18A to the other side plate 18B. The pair of internal screws are mounted on the pair of side plates 18A and 18B, respectively. When the lateral screw threadably engaged with both the pair of internal screws is driven into rotation, the pair of internal screws move toward and away from each other and, thus, the pair of side plates 18A, 18B also move toward and away from each other. The widthwise drive device 22 further includes a stepping motor as a drive source, a gear unit or the like that transmits rotation of the output shaft of the stepping motor to the pinion gear or the lateral screw, and so on.

The pair of side plates 18A, 18B move keeping mutually equal distances from and symmetrically to the center of the sheet rack 12 within a travel range from their respective reference positions PR, PL preset on both sides of the sheet rack 12 to both the side ends of the narrow portion 12C of the sheet rack 12.

End detecting devices 25A and 25B are provided on the tops of the pair of ledges 19A and 19B, respectively. The pair of end detecting devices 25A, 25B are disposed closer to the sheet rack 12 relative to the inner wall surfaces of the pair of side plates 18A, 18B. While the sheet rack 12 is stopped at the lower limit position PD, the end detecting devices 25A, 25B detect a recording paper sheet on the sheet rack 12 or the narrow portion 12C of the sheet rack 12 according to the moved positions of the pair of side plates 18A, 18B.

The end detecting devices 25A, 25B are, for example, reflective optical sensors including a light-emitting element and a light-receiving element. The end detecting devices 25A, 25B emit light of the light-emitting element to a lowermost recording paper sheet on the sheet rack 12 located at the lower limit position PD or the narrow portion 12C of the sheet rack 12 located at the lower limit position PD and receive reflected light from the uppermost recording paper sheet or the narrow portion 12C, thus detecting the lowermost recording paper sheet or the narrow portion 12C. In other words, the end detecting devices 25A, 25B detect both ends of the recording paper sheet abutting the pair of side plates 18A and 18B, respectively.

Figure 3:
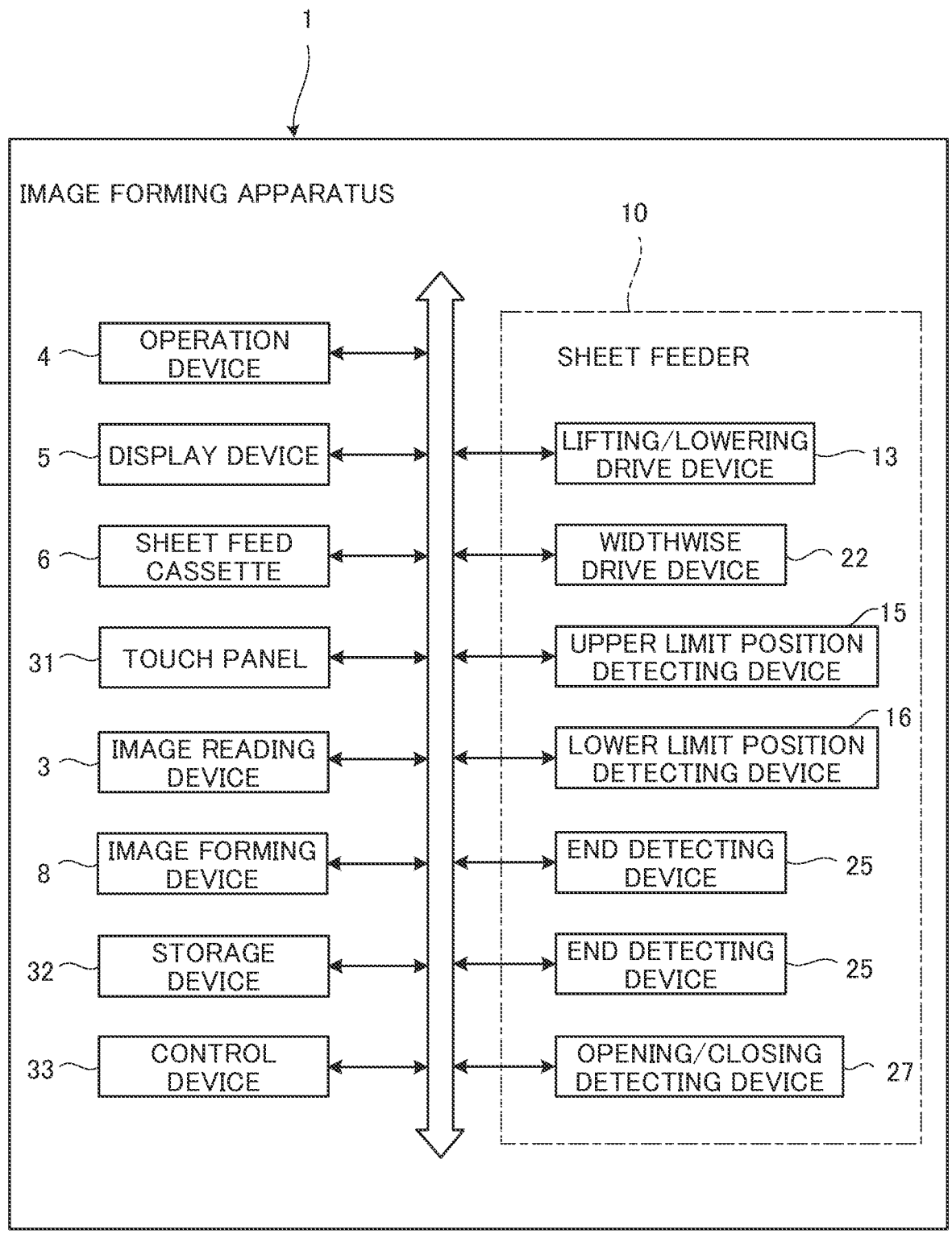
FIG. 3 is a functional block diagram showing an essential internal configuration of the image forming apparatus.

FIG. 3 is a functional block diagram showing an essential internal configuration of the image forming apparatus 1 and the sheet feeder 10. As shown in FIG. 3, the image forming apparatus 1 includes the image reading device 3, the operation device 4, the display device 5, the sheet feed cassettes 6, the image forming device 8, a touch panel 31, a storage device 32, a control device 33, the sheet feeder 10, and so on. These components are capable of sending and receiving data or signal from and to each other via a bus.

The display device 5 is composed of a liquid crystal display (LCD), an organic EL (organic light-emitting diode (OLED)) display or the like.

The touch panel 31 is disposed on the screen of the display device 5. The touch panel 31 is a touch panel of, for example, a resistive film system or a capacitance system. The touch panel 31 detects a touch of the touch panel 31 with a user's finger or the like, together with the point of touch, and outputs a detection signal indicating the coordinate of the point of touch to the control device 33 and so on.

The storage device 32 is a large storage device, such as an SSD (solid state drive) or an HDD (hard disk drive). The storage device 32 stores various application programs and various types of data.

The control device 33 is composed of a processor, a RAM (random access memory), a ROM (read only memory), and so on. The processor is, for example, a CPU (central processing unit), an ASIC (application specific integrated circuit) or an MPU (micro processing unit). The control device 33 executes a control program stored in the ROM or the storage device 32 to function as a processing device that executes various types of processing and so on necessary for the image formation of the image forming apparatus 1.

The control device 33 is connected to the image reading device 3, the operation device 4, the display device 5, the sheet feed cassettes 6, the image forming device 8, the touch panel 31, the storage device 32, the sheet feeder 10, and so on and performs control of the operations of these components, sending and receiving of signal or data to and from these components, and so on.

The control device 33 controls the display operation on the display device 5. The control device 33 accepts an instruction input by the user, based on a detection signal output from the touch panel 31 or an operation on a physical key of the operation device 4. For example, the control device 33 accepts through the touch panel 31 an instruction based on a touch gesture on a GUI (graphical user interface) or the like displayed on the screen of the display device 5.

The control device 33 controls the sheet feeder 10. The sheet feeder 10 includes the lifting/lowering drive device 13, the upper limit position detecting device 15, the lower limit position detecting device 16, the widthwise drive device 22, the pair of end detecting devices 25A, 25B, an opening/closing detecting device 27, and so on.

The lifting/lowering drive device 13 contains a stepping motor which is a drive source for moving the sheet rack 12 vertically in the above manner. The widthwise drive device 22 contains a stepping motor which is a drive source for moving the pair of side plates 18A, 18B toward and away from each other in the above manner.

The control device 33 controls the drive of the stepping motor of the lifting/lowering drive device 13 to move up and down the sheet rack 12. The control device 33 determines, based on the detected output of the upper limit position detecting device 15 or the detected output of the lower limit position detecting device 16, that the sheet rack 12 has reached the upper limit position PU or the lower limit position PD. The control device 33 controls the number, phase and so on of pulses to be applied to the stepping motor of the lifting/lowering drive device 13 to move the sheet rack 12 downward from the upper limit position PU or upward from the lower limit position PD, thus adjusting the vertical position of the sheet rack 12.

The control device 33 controls the drive of the stepping motor of the widthwise drive device 22 to move the pair of side plates 18A, 18B toward and away from each other. While moving the pair of side plates 18A, 18B toward each other, the control device 33 determines, based on the detected outputs of the pair of end detecting devices 25A, 25B, proximal positions of the recording paper sheets on the sheet rack 12 or the narrow portion 12C of the sheet rack 12 relative to the pair of side plates 18A, 18B having reached the proximity of the recording paper sheets or the narrow portion 12C. The control device 33 controls the number, phase and so on of pulses to be applied to the stepping motor of the widthwise drive device 22 to move the pair of side plates 18A, 18B further fixed distances, thus allowing the inner wall surfaces of the pair of side plates 18A, 18B to abut both widthwise ends of the recording paper sheets on the sheet rack 12 or both ends of the narrow portion 12C of the sheet rack 12.

The sheet feeder 10 may include the control device 33 or a control circuit that executes the function of performing, among controls executed by the control device 33, control over the drive of the sheet feeder 10.

The fixed distances used herein refer to the respective widthwise distances from the proximal positions of the recording paper sheets on the sheet rack 12 or the narrow portion 12C of the sheet rack 12 detected by the pair of end detecting devices 25A, 25B to the inner wall surfaces of the pair of side plates 18A, 18B. The pair of end detecting devices 25A, 25B are disposed, on the tops of the ledges 19A, 19B, closer to the sheet rack 12 relative to the pair of side plates 18A, 18B, respectively. Therefore, in order to abut the inner wall surfaces of the pair of side plates 18A, 18B against both ends of the recording paper sheets on the sheet rack 12 or both ends of the narrow portion 12C of the sheet rack 12, it is necessary to move the pair of side plates 18A, 18B the further fixed distances from the proximal positions of the recording paper sheets on the sheet rack 12 or the narrow portion 12C of the sheet rack 12.

The opening/closing detecting device 27 detects the opening/closing of the cover 10A of the sheet feeder 10. The control device 33 determines, based on the detected output of the opening/closing detecting device 27, whether the cover 10A of the sheet feeder 10 is open or closed.

Next, a description will be given of the basic operation of the sheet feeder 10. FIGS. 4 to 10 are views schematically showing the sheet feeder 10 as viewed from the direction of the arrow F in FIG. 2.

Figure 4:
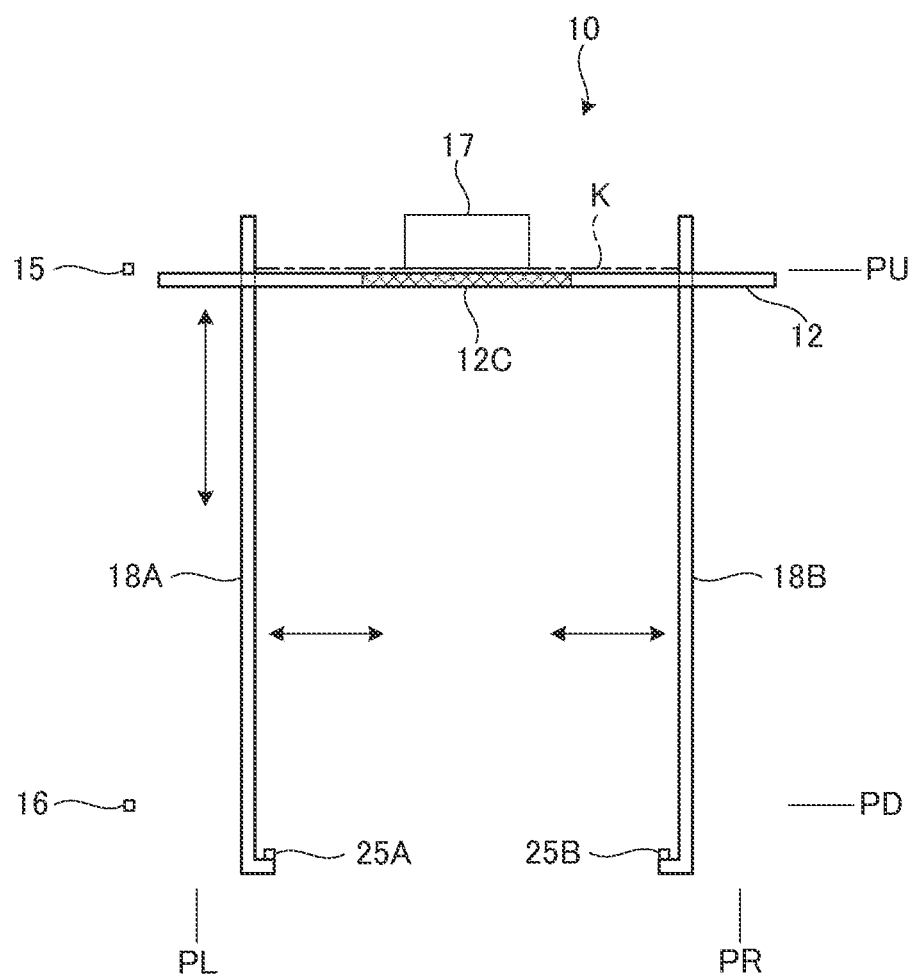
FIGS. 4 to 10 are views schematically showing the sheet feeder as viewed from the direction of the arrow F in FIG. 2.

As shown in FIG. 4, with recording paper sheets K loaded on the sheet rack 12, the control device 33 controls the drive of the stepping motor of the lifting/lowering drive device 13 to move up the sheet rack 12. When determining, based on the detected output of the upper limit position detecting device 15, that the recording paper sheets K on the sheet rack 12 have reached the upper limit position PU, the control device 33 stops the sheet rack 12 and presses the uppermost recording paper sheet K on the sheet rack 12 against the sheet feed roller 17. The control device 33 allows the sheet feed roller 17 to feed the recording paper sheet K on the sheet rack 12 from the sheet feeder 10 to the image forming apparatus 1.

Figure 5:
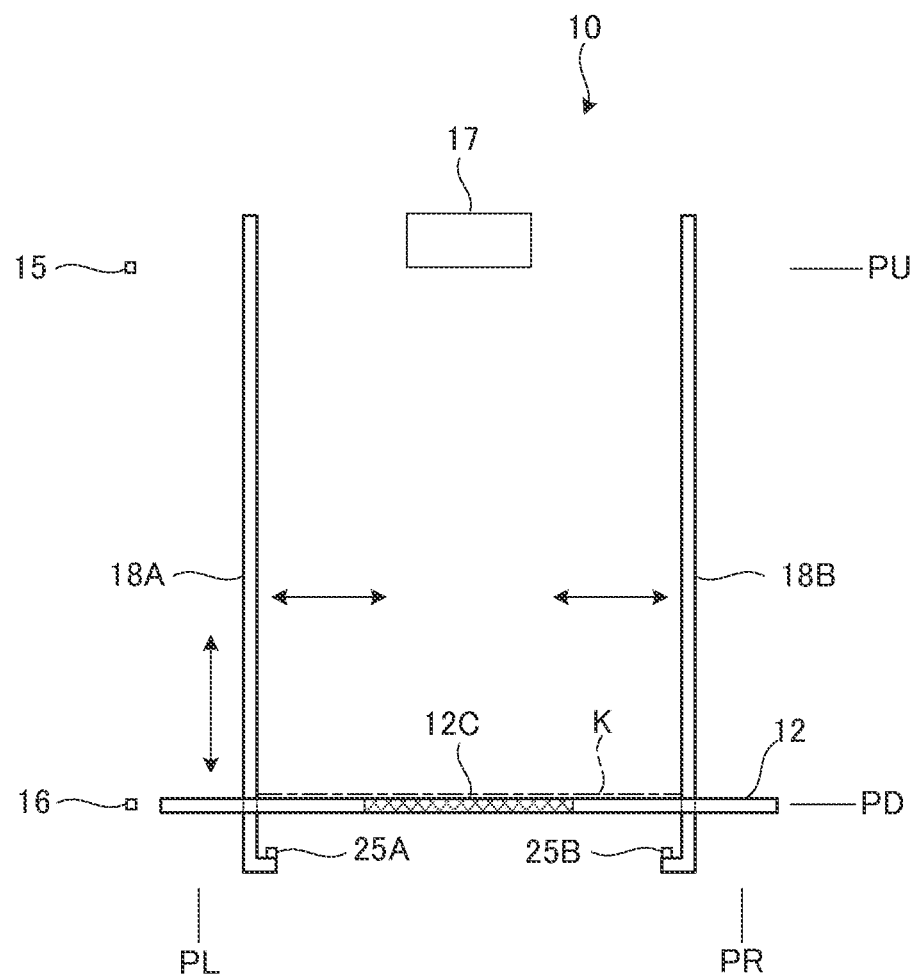

When the cover 10A of the sheet feeder 10 is opened, the control device 33 determines, based on the detected output of the opening/closing detecting device 27, that the cover 10A of the sheet feeder 10 is open, and controls the drive of the stepping motor of the lifting/lowering drive device 13 to move down the sheet rack 12. When determining, based on the detected output of the lower limit position detecting device 16, that the sheet rack 12 has reached the lower limit position PD, the control device 33 stops the stepping motor of the lifting/lowering drive device 13 to stop the sheet rack 12 at the lower limit position PD as shown in FIG. 5.

Figure 6:
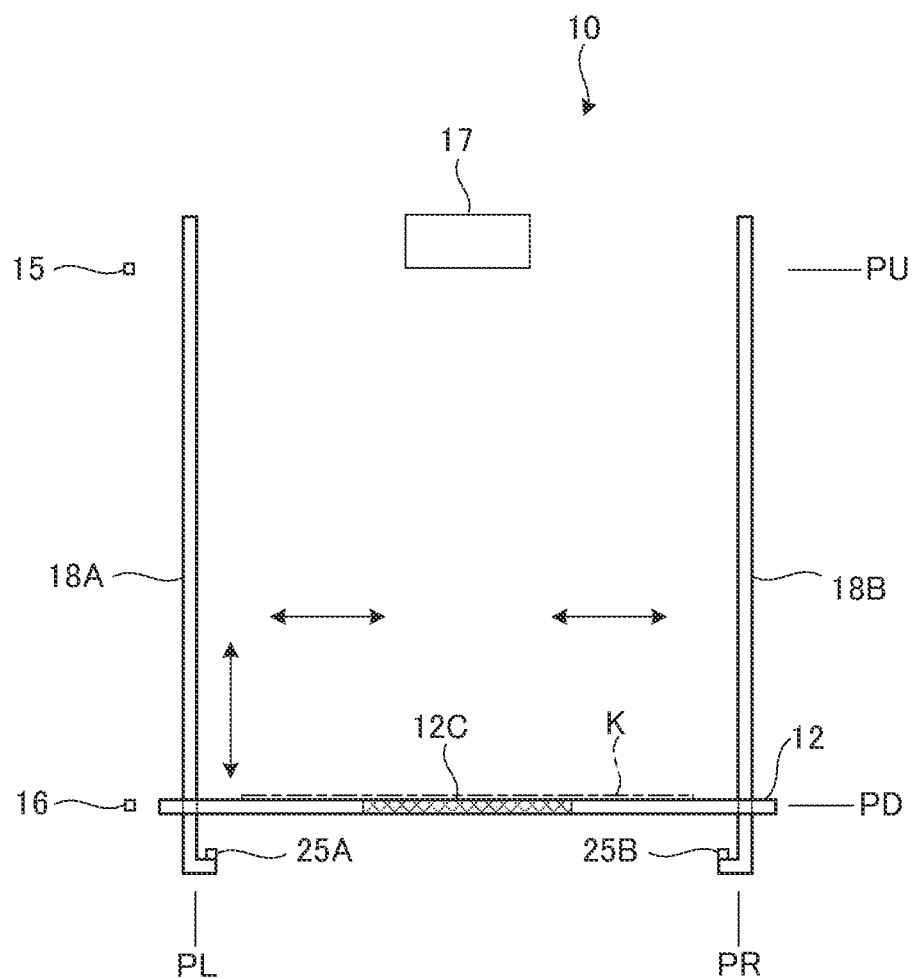

The control device 33 keeps the current positions of the pair of side plates 18A, 18B unchanged or controls the drive of the stepping motor of the widthwise drive device 22 to move the pair of side plates 18A, 18B to their respective reference positions PR, PL preset on both sides of the sheet rack 12 and stop them at the reference positions PR, PL as shown in FIG. 6.

When the positions of the pair of side plates 18A, 18B are kept unchanged, the size for recording paper sheets K to be loaded is also kept unchanged and a plurality of recording paper sheets K of the same size as used until then are loaded on the sheet rack 12 and placed between the pair of side plates 18A, 18B. When the positions of the pair of side plates 18A, 18B are kept unchanged, the control device 33 determines the unchanged size as the size of the loaded recording paper sheets K.

Figure 7:
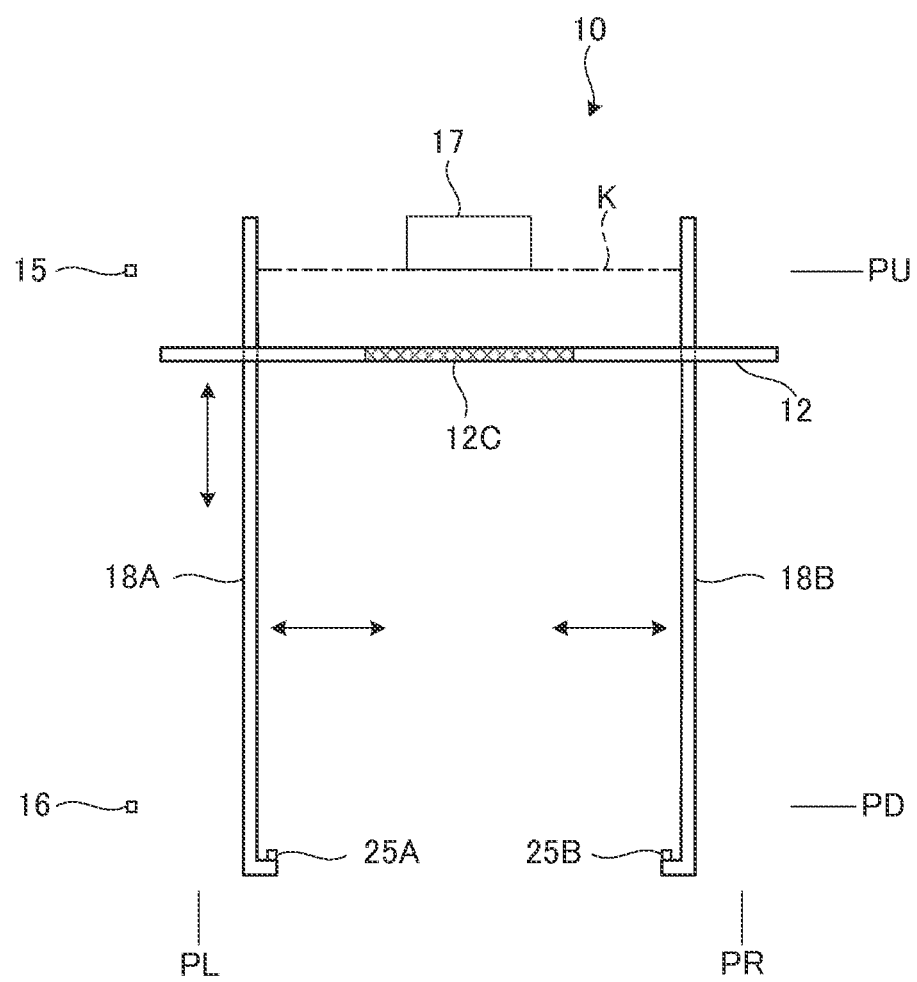

When the cover 10A of the sheet feeder 10 is closed, the control device 33 determines, based on the detected output of the opening/closing detecting device 27, that the cover 10A of the sheet feeder 10 is closed, and controls the drive of the stepping motor of the lifting/lowering drive device 13 to move up the sheet rack 12. The control device 33 stops the stepping motor of the lifting/lowering drive device 13 based on the detected output of the upper limit position detecting device 15 and presses the uppermost recording paper sheet K on the sheet rack 12 against the sheet feed roller 17 as shown in FIG. 7.

Figure 8:
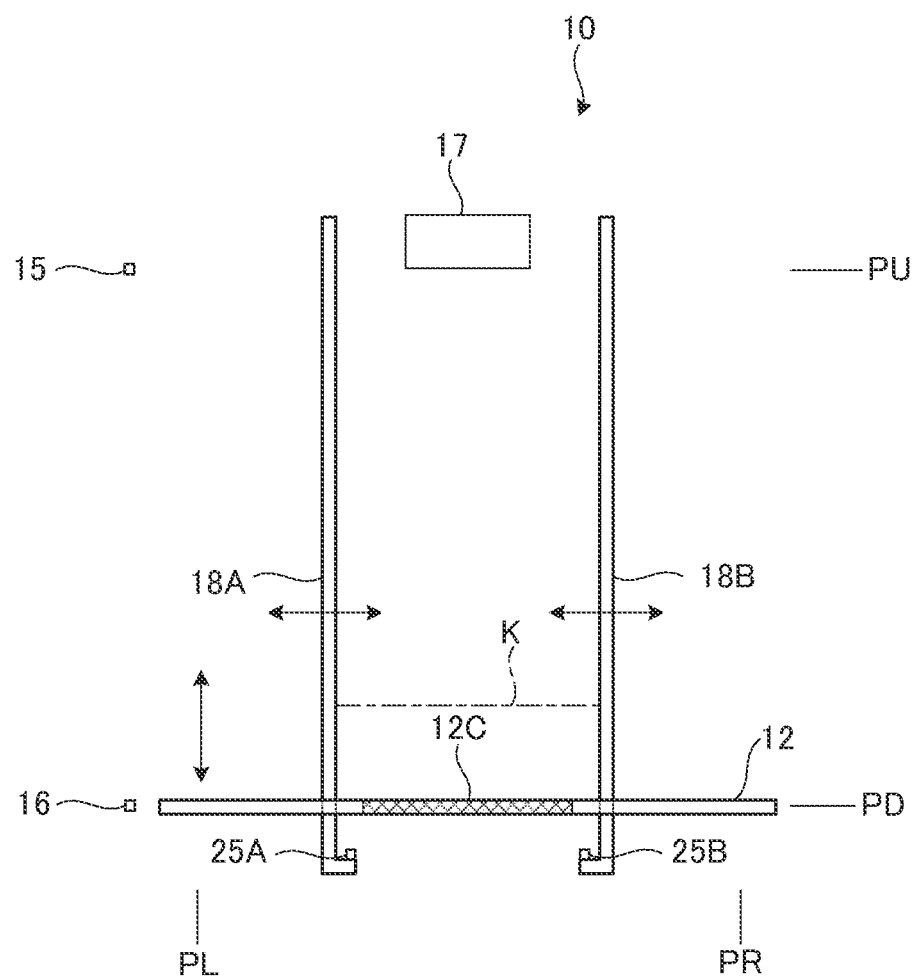

On the other hand, when the pair of side plates 18A, 18B move to and stop at their respective reference positions PR, PL, a plurality of recording paper sheets K of arbitrary size are loaded on the sheet rack 12. When the cover 10A of the sheet feeder 10 is closed, the control device 33 determines, based on the detected output of the opening/closing detecting device 27, that the cover 10A of the sheet feeder 10 is closed, and controls, based on the detected outputs of the pair of end detecting devices 25A, 25B, the drive of the stepping motor of the widthwise drive device 22 to abut the pair of side plates 18A, 18B against both ends of the plurality of recording paper sheets K on the sheet rack 12 as shown in FIG. 8.

Figure 9:
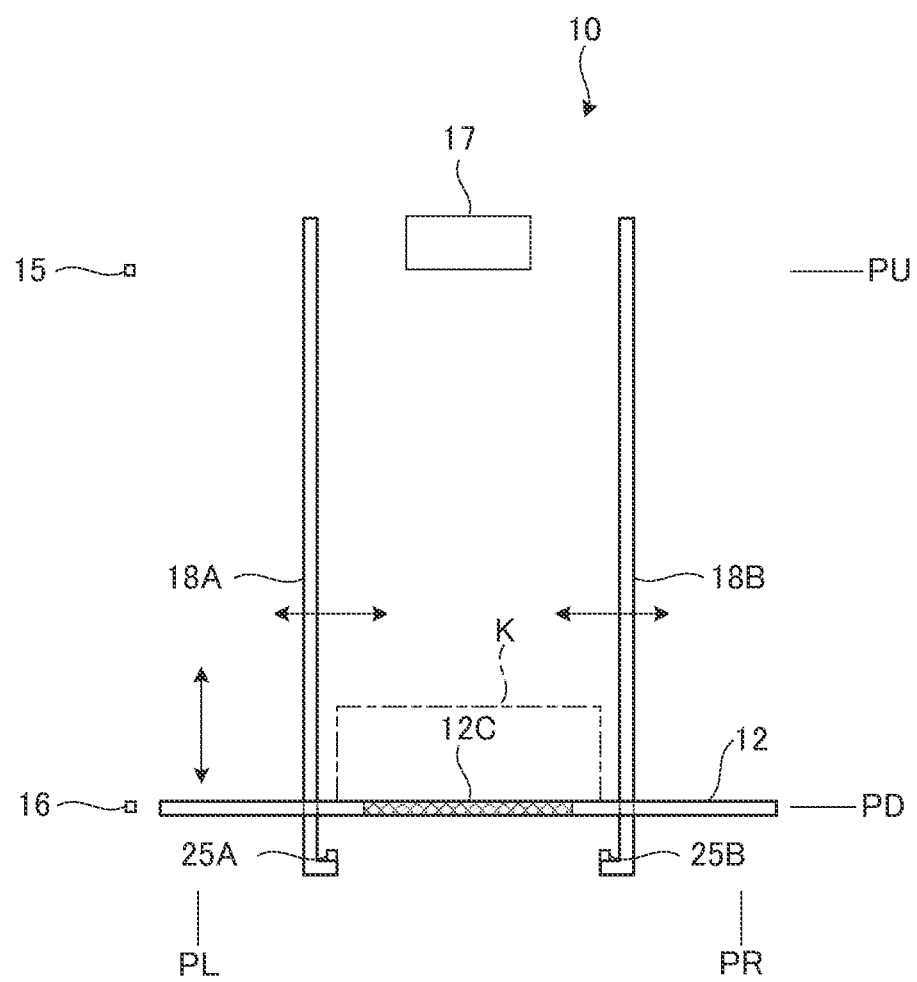

In doing so, as shown in FIG. 9, the control device 33 may move the pair of side plates 18A, 18B slightly back away from the locations of abutment against both ends of the plurality of recording paper sheets K and then return the pair of side plates 18A, 18B to the locations of abutment. Thus, the deflection, tilt or so on of each recording paper sheet K can be corrected to align both ends of the recording paper sheets K well. When abutting the pair of side plates 18A, 18B against both ends of the plurality of recording paper sheets K on the sheet rack 12 to align both ends of the plurality of recording paper sheets K, the control device 33 determines the size of the recording paper sheets K based on the positions of the pair of side plates 18A, 18B.

Figure 10:
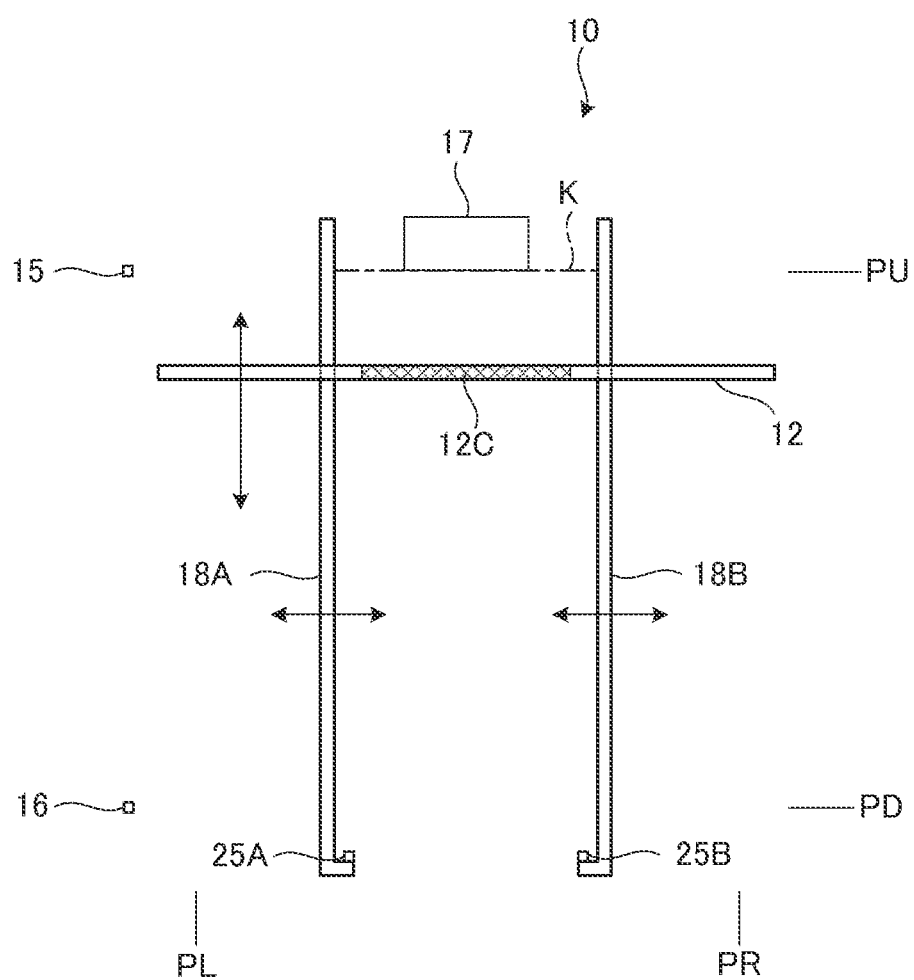

The control device 33 controls the drive of the stepping motor of the lifting/lowering drive device 13 to move up the sheet rack 12. The control device 33 stops the stepping motor of the lifting/lowering drive device 13 based on the detected output of the upper limit position detecting device 15 and presses the uppermost recording paper sheet K on the sheet rack 12 against the sheet feed roller 17 as shown in FIG. 10.

As thus far described, when, in the sheet feeder 10, the cover 10A thereof is opened, the sheet rack 12 moves down to the lower limit position PD and a plurality of recording paper sheets K are loaded on the sheet rack 12. Then, when the cover 10A of the sheet feeder 10 is closed, both ends of the plurality of recording paper sheets K on the sheet rack 12 are aligned, the size of the recording paper sheets K is determined, the sheet rack 12 then moves up, and the uppermost recording paper sheet K on the sheet rack 12 is thus pressed against the sheet feed roller 17.

Figure 11A:
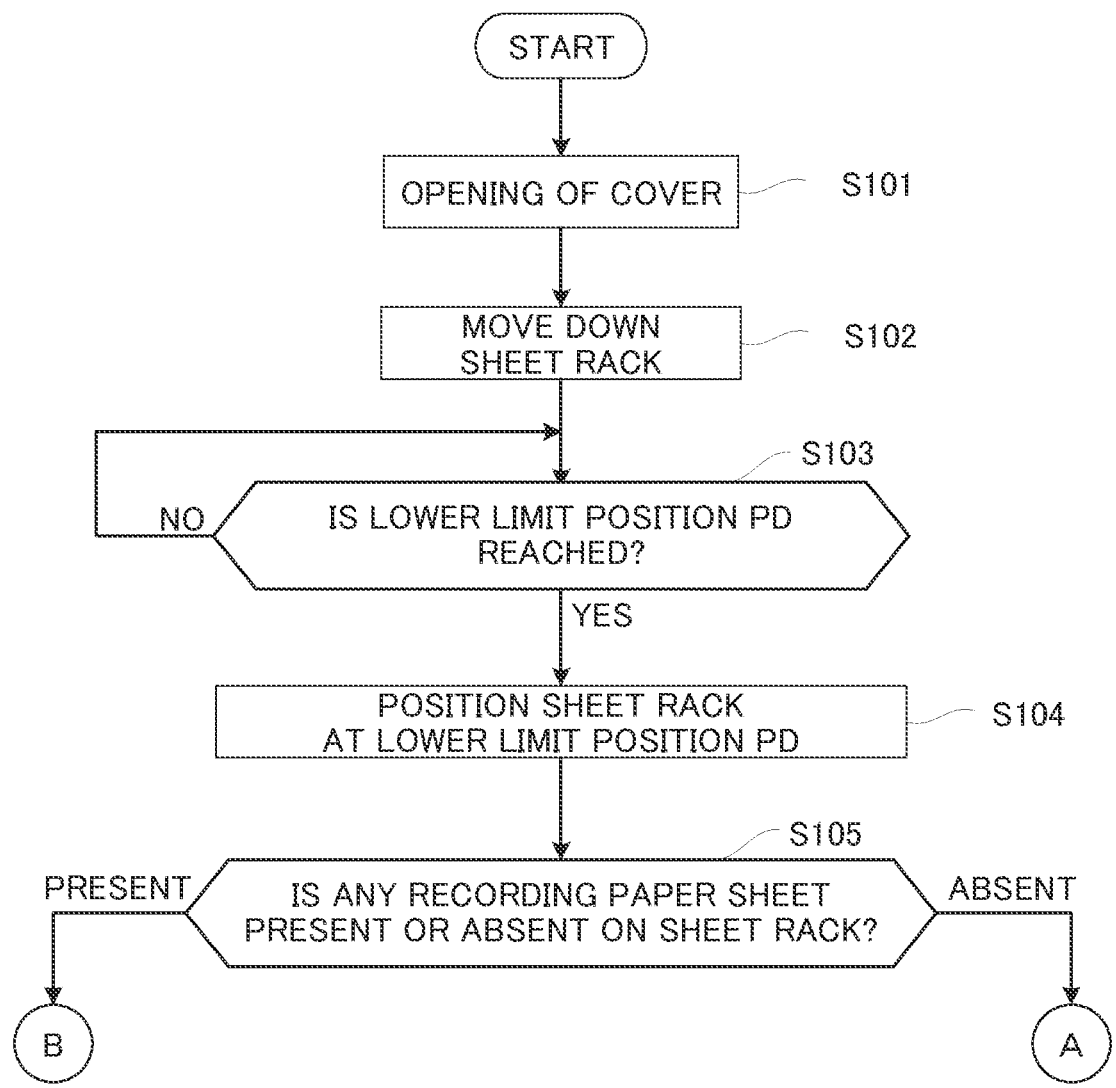
FIGS. 11A to 11C show a flowchart showing a procedure for control over the sheet feeder from the opening of a cover of the sheet feeder to the loading of a plurality of recording paper sheets on a sheet rack.
Figure 11B:
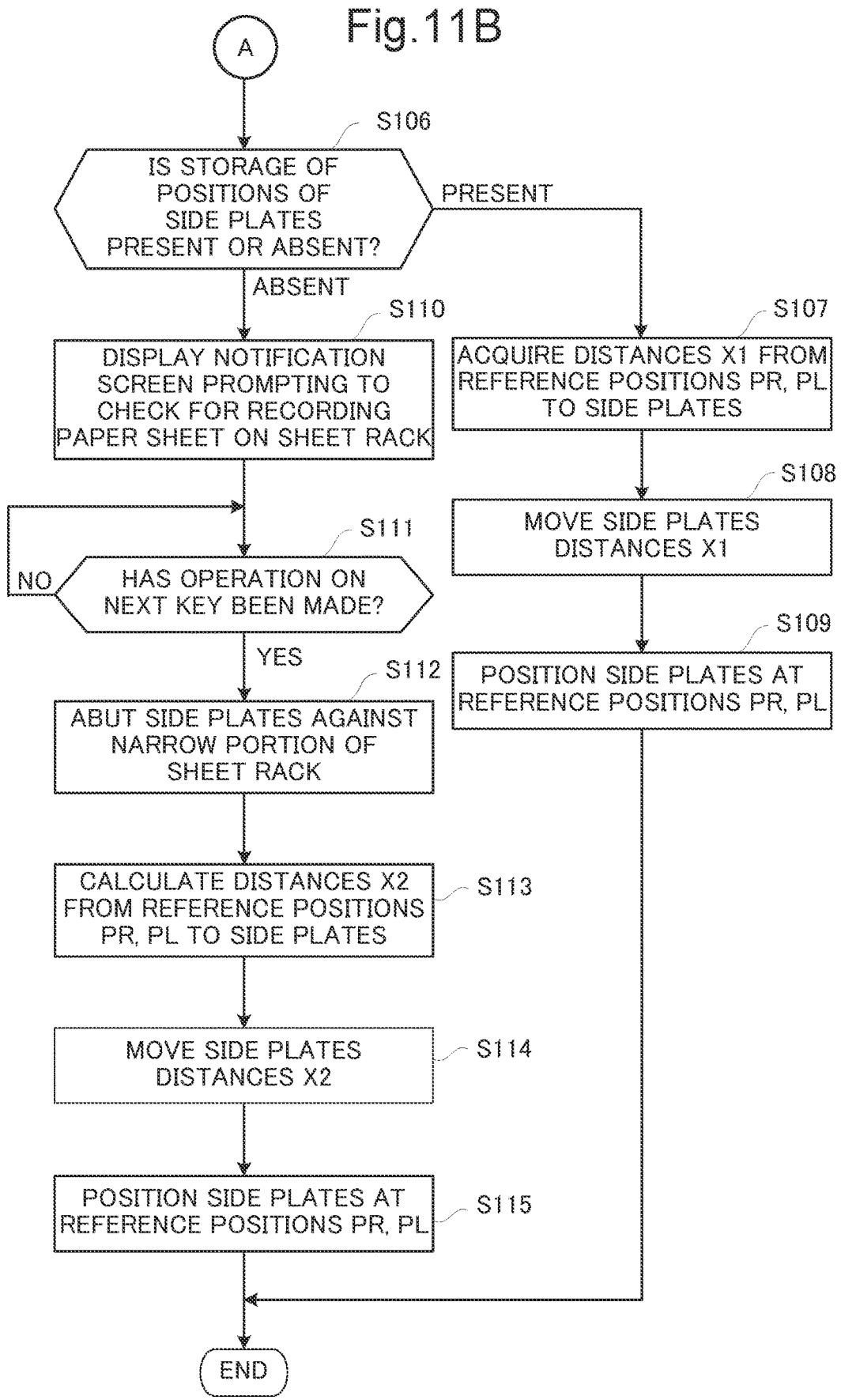
Figure 11C:
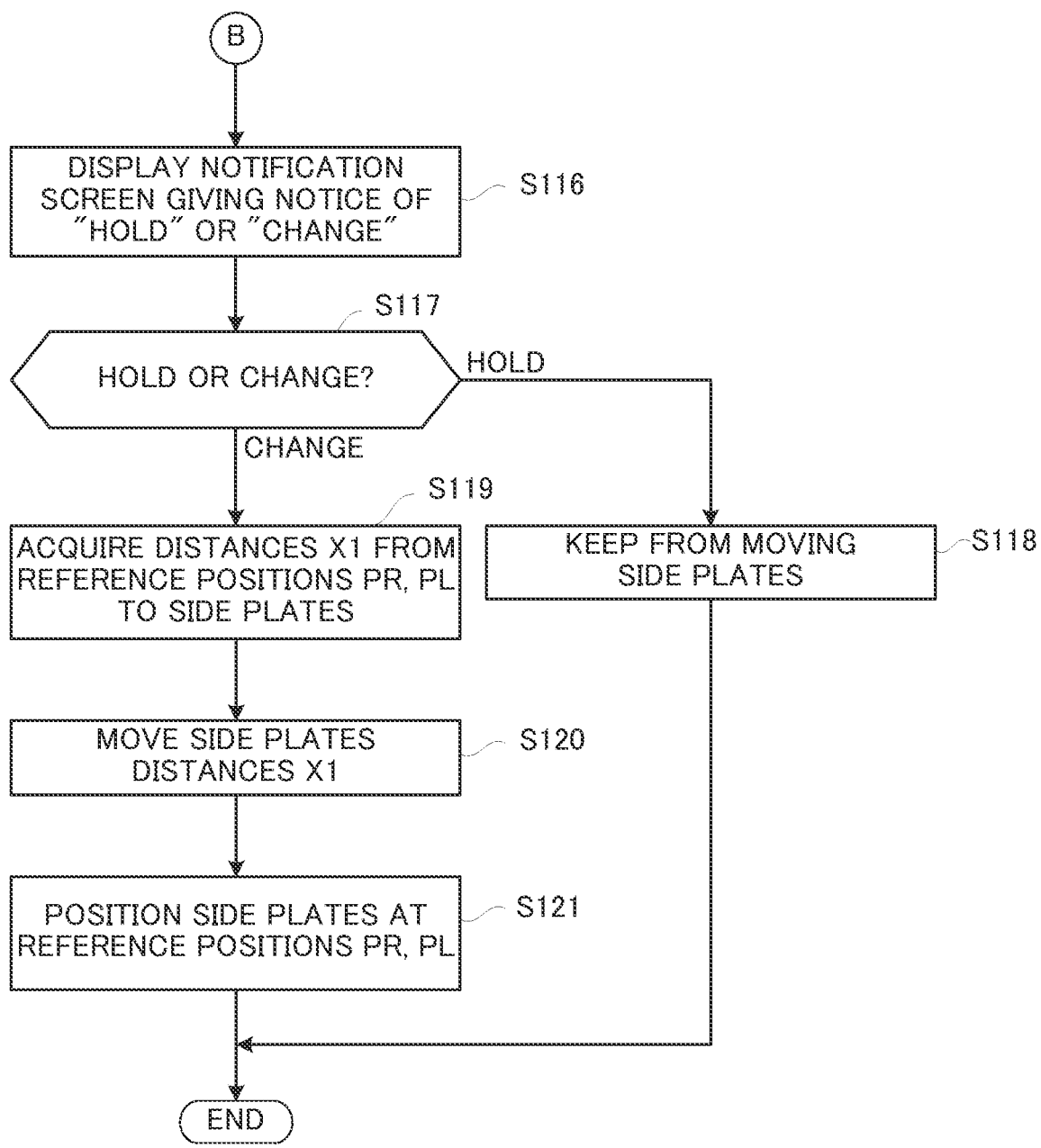

Next, a description will be given of a procedure of control of the control device 33 over the sheet feeder 10 from the opening of the cover 10A of the sheet feeder 10 to the loading of a plurality of recording paper sheets K on the sheet rack 12, with reference to the flowchart shown in FIGS. 11A to 11C and other reference materials.

When the user opens the cover 10A of the sheet feeder 10, the control device 33 determines, based on the detected output of the opening/closing detecting device 27, that the cover 10A of the sheet feeder 10 is open (step S101), and controls the drive of the stepping motor of the lifting/lowering drive device 13 to move down the sheet rack 12 (step S102). The control device 33 determines, based on the detected output of the lower limit position detecting device 16, whether or not the sheet rack 12 has reached the lower limit position PD (step S103). When determining that the sheet rack 12 has reached the lower limit position PD ("Yes" in step S103), the control device 33 stops the stepping motor of the lifting/lowering drive device 13 to position the sheet rack 12 at the lower limit position PD (step S104) as shown in FIG. 5.

The control device 33 determines, based on the detected outputs of the end detecting device 25A and the end detecting device 25B, the presence or absence of any recording paper sheet K on the sheet rack 12 (step S105).

When all of recording paper sheets K on the sheet rack 12 have already been fed and no recording paper sheet K is left on the sheet rack 12, the end detecting device 25A and the end detecting device 25B detect no recording paper sheet K on the sheet rack 12 and the control device 33 determines that there is no recording paper sheet K on the sheet rack 12 ("Absent" in step S105). In this case, the control device 33 determines whether or not the positions of the side plates 18A, 18B are stored in the storage device 32 (step S106).

In this relation, when, as described previously, the control device 33 controls, based on the detected outputs of the end detecting device 25A and the end detecting device 25B, the drive of the stepping motor of the widthwise drive device 22 to abut the side plates 18A, 18B against both widthwise ends of the recording paper sheets K on the sheet rack 12 as shown in FIG. 8, it calculates the positions of the side plates 18A, 18B abutting both ends of the recording paper sheets K and allows the storage device 32 to store the calculated positions of the side plates 18A, 18B. Therefore, so long as the sheet feeder 10 continues to be used, the positions of the side plates 18A, 18B having abutted both ends of the recording paper sheets K on the sheet rack 12 are stored in the storage device 32 regardless of the presence or absence of any recording paper sheet K on the sheet rack 12. As a result, the control device 33 can read the positions of the side plates 18A, 18B from the storage device 32.

When determining that the positions of the side plates 18A, 18B are stored in the storage device 32 ("Present" in step S106), the control device 33 acquires the positions of the side plates 18A, 18B by reading them from the storage device 32 (step S107).

Figure 12:
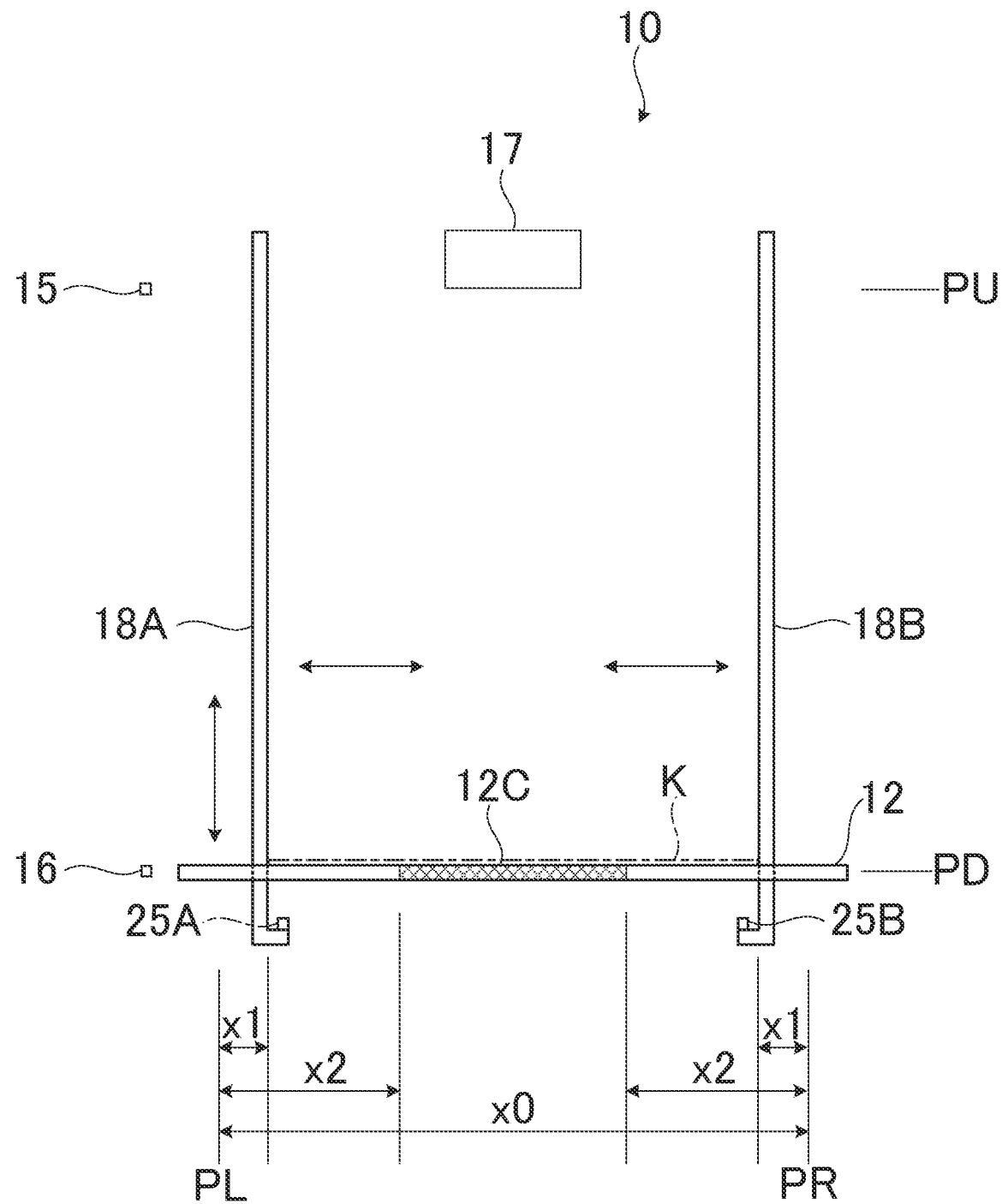
FIG. 12 is an illustration showing the respective distances from respective reference positions to the inner wall surfaces of the pair of side plates, the respective distances from the respective reference positions to both ends of a narrow portion of the sheet rack, and the distance between the reference positions spaced apart from each other.

For example, in step S107, the control device 33 acquires as the positions of the side plates 18A, 18B the respective travel distances x1 from the reference positions PR, PL on both sides of the sheet rack 12 to the inner wall surfaces of the side plates 18A, 18B as shown in FIG. 12. The control device 33 controls the number and phase of pulses to be applied to the stepping motor of the widthwise drive device 22 to move the side plates 18A, 18B the respective travel distances x1 in opposite directions away from each other (step S108). The control device 33 stops the side plates 18A, 18B at their respective reference positions PR, PL (step S109).

Figure 13:
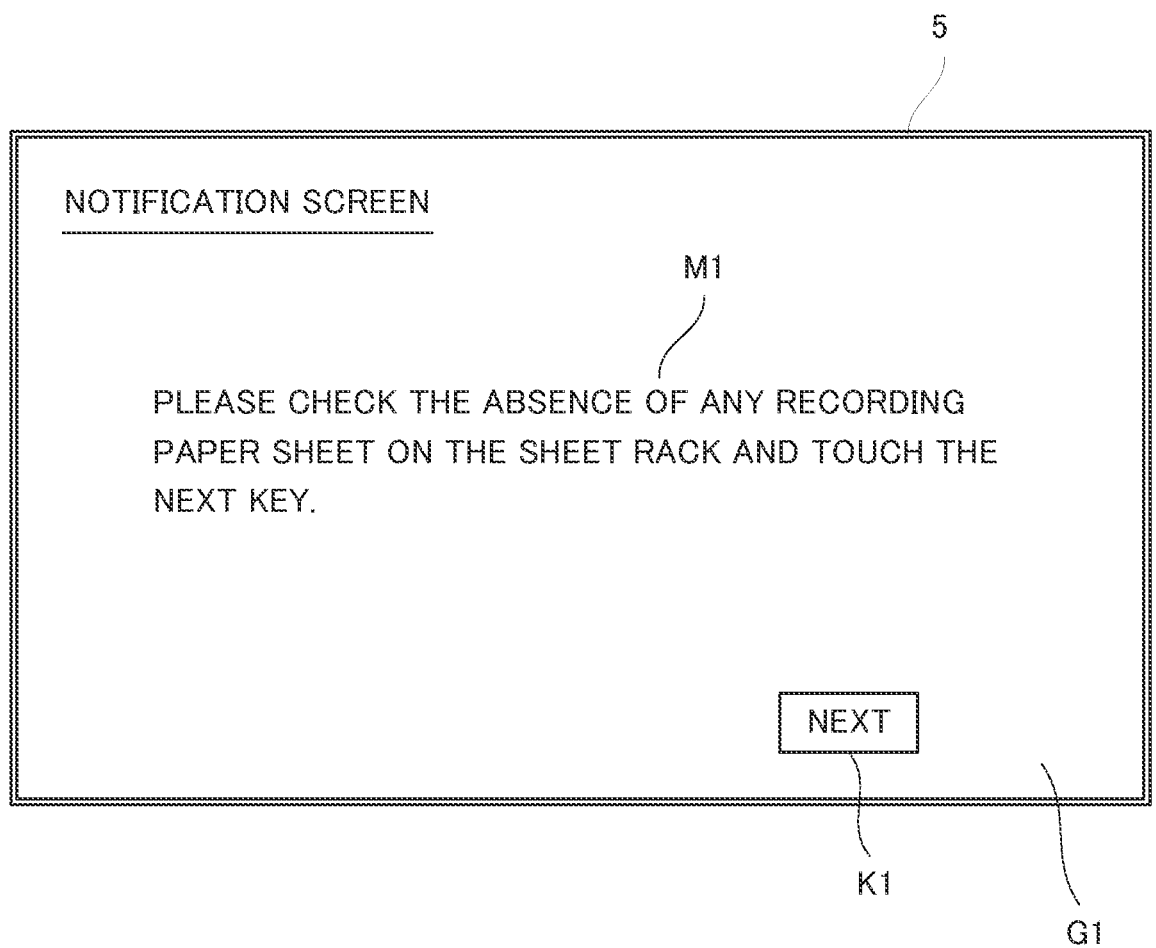
FIG. 13 shows an example of a first notification screen.

On the other hand, when determining that the positions of the side plates 18A, 18B are not stored in the storage device 32 ("Absent" in step S106), the control device 33 cannot identify the positions of the side plates 18A, 18B and, therefore, allows the display device 5 to display a first notification screen G1 shown in FIG. 13 (step S110). The control device 33 allows the display device 5 to display on the first notification screen G1 a message M1 "Please check the absence of any recording paper sheet on the sheet rack and touch the Next key." and a Next key K1.

Seeing the message M1, the user checks the absence of any recording paper sheet on the sheet rack 12 and touches the Next key K1. After the display of the first notification screen G1, the control device 33 waits for a touch gesture on the Next key K1 ("No" in step S111). When detecting a touch gesture on the Next key K1 through the touch panel 31 ("Yes" in step S111), the control device 33 controls the drive of the stepping motor of the widthwise drive device 22 to move the side plates 18A, 18B toward each other and abut the side plates 18A, 18B against both ends of the narrow portion 12C of the sheet rack 12 based on the detected outputs of the end detecting device 25A and the end detecting device 25B (step S112).

Figure 14:
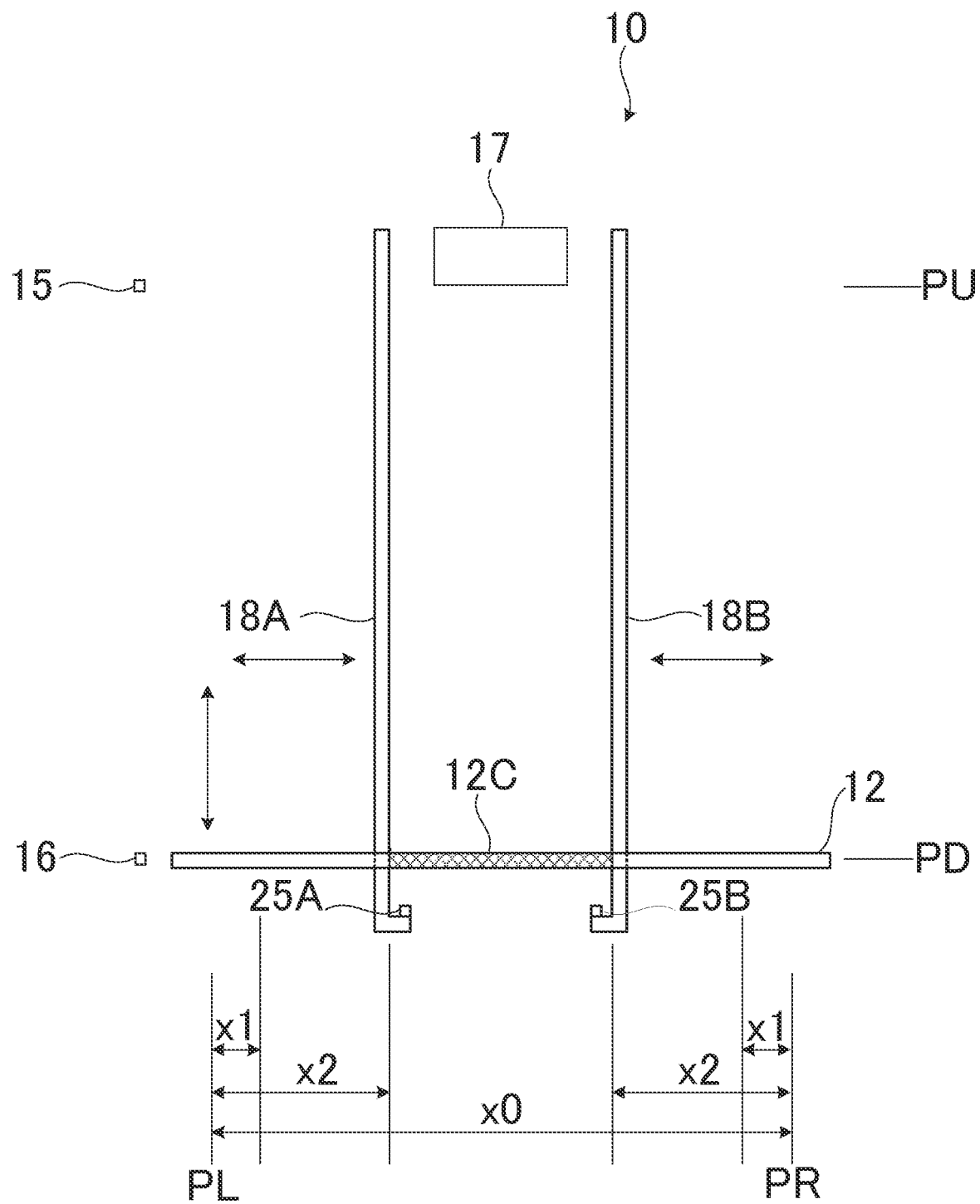
FIG. 14 is a view schematically showing the sheet feeder as viewed from the direction of the arrow F in FIG. 2.

Because the positions of both ends of the narrow portion 12C of the sheet rack 12 are already known, the control device 33 calculates, as the positions of the side plates 18A, 18B abutting both ends of the narrow portion 12C of the sheet rack 12, the respective travel distances x2 from the respective reference positions PR, PL on both sides of the sheet rack 12 to both ends of the narrow portion 12C (step S113) as shown in FIG. 14. Furthermore, the control device 33 controls the number and phase of pulses to be applied to the stepping motor of the widthwise drive device 22 to move the side plates 18A, 18B the respective travel distances x2 in opposite directions away from each other (step S114). The control device 33 stops the side plates 18A, 18B at their respective reference positions PR, PL (step S115).

Therefore, when no recording paper sheet K is left on the sheet rack 12 at the opening of the cover 10A of the sheet feeder 10, the side plates 18A, 18B move to their respective reference positions PR, PL to make the sheet rack 12 ready to be loaded with a plurality of recording paper sheets K of any standard size. In this state, the user loads a plurality of recording paper sheets K of any standard size in a space between the side plates 18A, 18B on the sheet rack 12.

Figure 15:
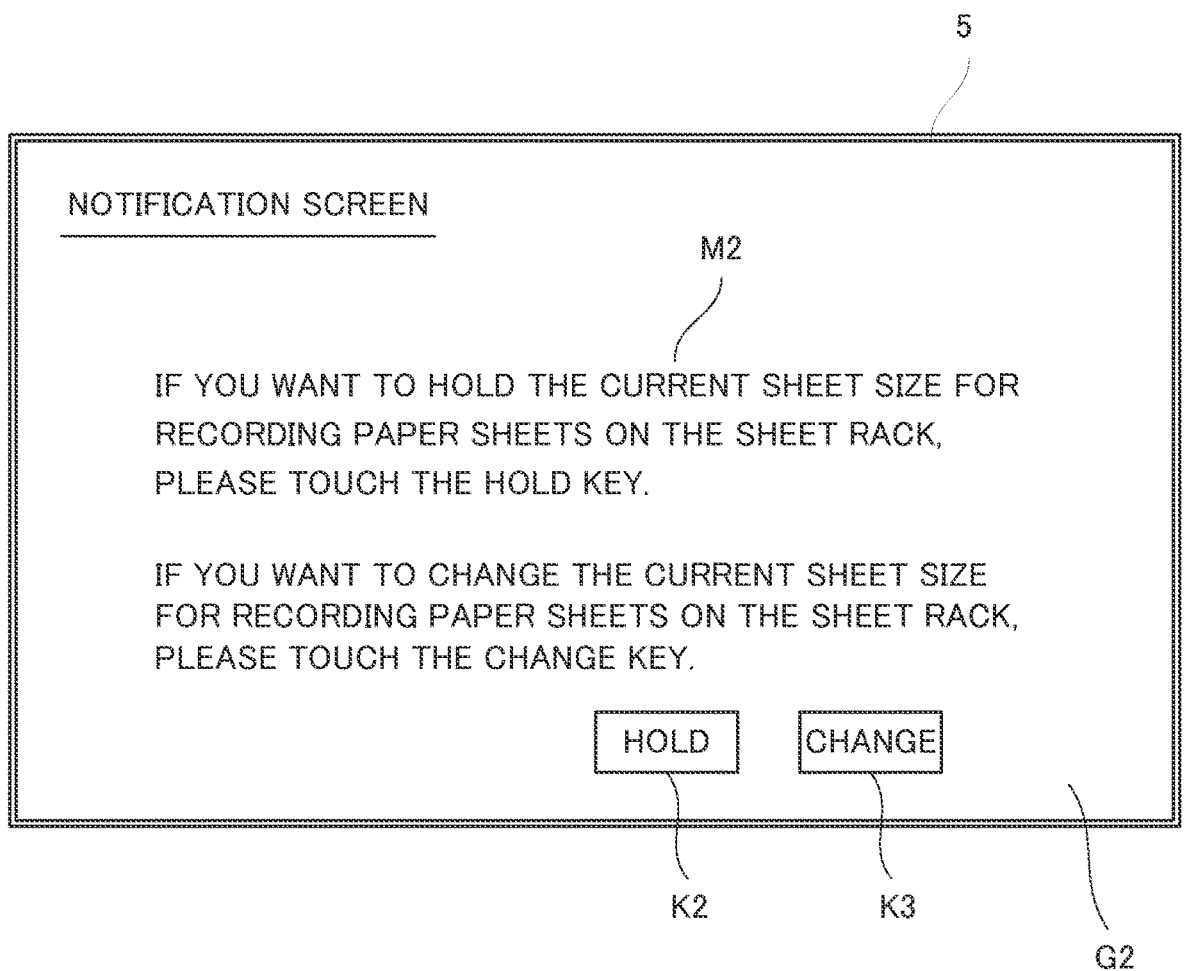
FIG. 15 shows an example of a second notification screen.

On the other hand, when the cover 10A of the sheet feeder 10 is opened with any recording paper sheet K present on the sheet rack 12, the control device 33 determines that any recording paper sheet K is present on the sheet rack 12 ("Present" in step S105) and allows the display device 5 to display a second notification screen G2 shown in FIG. 15 (step S116). The control device 33 allows the display device 5 to display on the second notification screen G2 a message M2 "If you want to hold the current sheet size for recording paper sheets on the sheet rack, please touch the Hold key. If you want to change the sheet size for recording paper sheets on the sheet rack, please touch the Change key.", a Hold key K2, and a Change key K3.

For example, seeing the message M2, the user touches the Hold key K2 and additionally loads on the sheet rack 12 a plurality of recording paper sheets K of the same size as the recording paper sheet(s) K on the sheet rack 12.

After the display of the second notification screen G2, the control device 33 waits for a touch gesture on the Hold key K2 or the Change key K3 (step S117). When detecting a touch gesture on the Hold key K2 through the touch panel 31 ("Hold" in step S117), the control device 33 does not drive the stepping motor of the widthwise drive device 22, i.e., does not move the side plates 18A, 18B, and holds the current positions of the side plates 18A, 18B (step S118).

As just described, when the user touches the Hold key K2 representing the holding of the size for recording paper sheets K while any recording paper sheet K is left on the sheet rack 12, the current positions of the side plates 18A, 18B are held. The user additionally loads on the sheet rack 12 a plurality of recording paper sheets K of the same size as the recording paper sheet(s) K on the sheet rack 12.

Alternatively, seeing the message M2, the user touches the Change key K3. When, after the display of the second notification screen G2, the control device 33 detects a touch gesture on the Change key K3 through the touch panel 31 ("Change" in step S117), it reads the positions of the side plates 18A, 18B from the storage device 32 to acquire them (step S119). For example, in step S119, the control device 33 acquires, as the positions of the side plates 18A, 18B having abutted both ends of the recording paper sheets on the sheet rack 12, the respective travel distances x1 from the reference positions PR, PL on both sides of the sheet rack 12 to the positions of the side plates 18A, 18B as shown in FIG. 12. The control device 33 controls the number and phase of pulses to be applied to the stepping motor of the widthwise drive device 22 to move the side plates 18A, 18B the respective travel distances x1 in opposite directions away from each other (step S120). The control device 33 stops the side plates 18A, 18B at their respective reference positions PR, PL (step S121).

In this state, the user loads a plurality of recording paper sheets K of any standard size in a space between the side plates 18A, 18B on the sheet rack 12.

As just described, when the user touches the Change key K3 representing the change of the size for recording paper sheets K while any recording paper sheet K is left on the sheet rack 12, the side plates 18A, 18B move to their respective reference positions PR, PL. The user loads a plurality of recording paper sheets K of any standard size on the sheet rack 12.

As described above, in step S109, S115 or S121, the side plates 18A, 18B move to their respective reference positions PR, PL and a plurality of recording paper sheets K of any standard size are loaded on the sheet rack 12 by the user. On the other hand, in step S118, the positions of the side plates 18A, 18B are held and a plurality of recording paper sheets K of the same size as the recording paper sheet(s) K on the sheet rack 12 are additionally loaded on the sheet rack 12.

Figure 16:
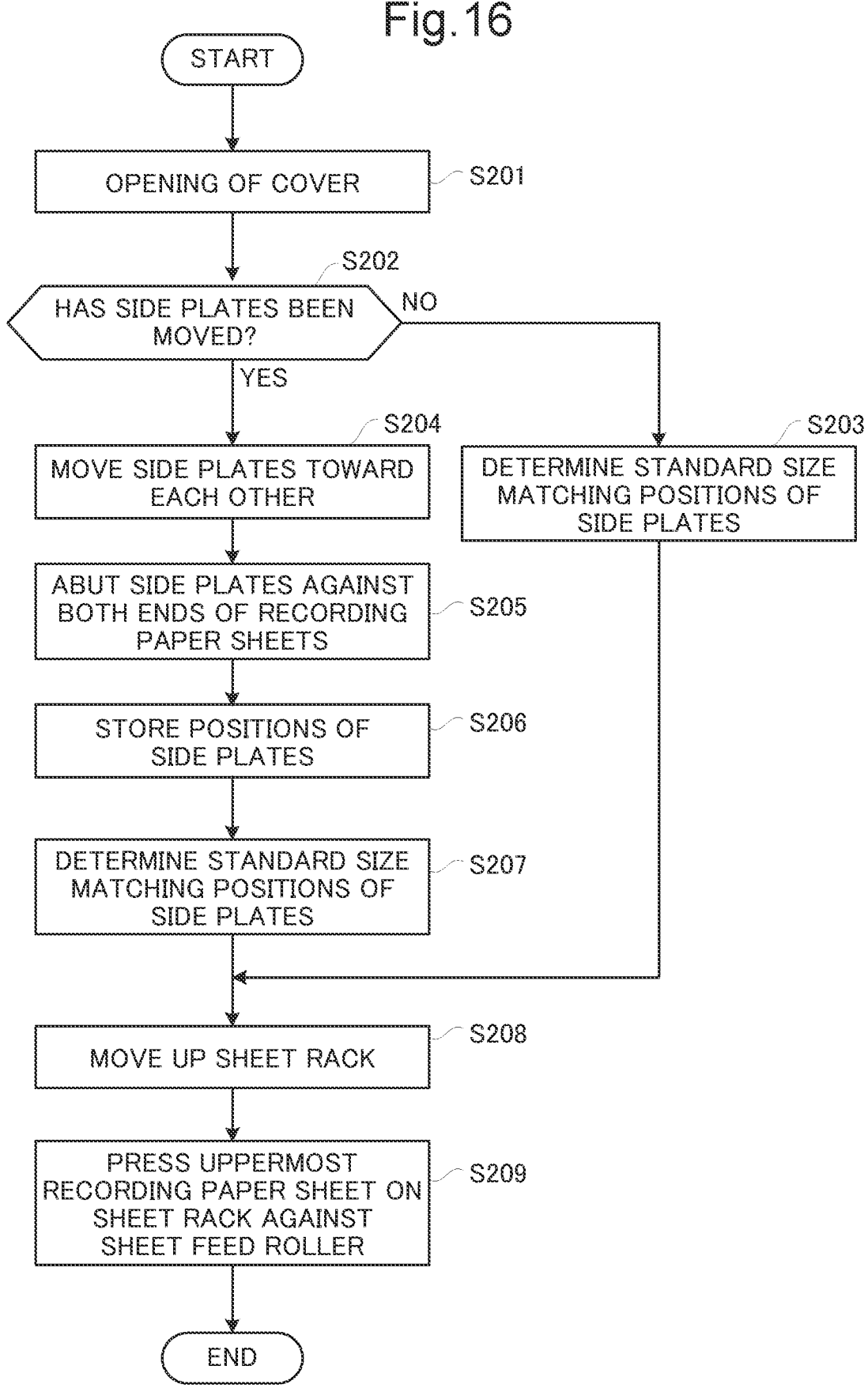
FIG. 16 shows a flowchart showing a procedure for control over the sheet feeder from the closing of the cover of the sheet feeder to the pressing of an uppermost recording paper sheet on the sheet rack against a sheet feed roller.

Next, a description will be given of a procedure of control of the sheet feeder 10 from the closing of the cover 10A of the sheet feeder 10 to the pressing of the uppermost recording paper sheet K on the sheet rack 12 against the sheet feed roller 17, with reference to the flowchart shown in FIG. 16 and other reference materials.

When the user closes the cover 10A of the sheet feeder 10, the control device 33 determines, based on the detected output of the opening/closing detecting device 27, that the cover 10A of the sheet feeder 10 is closed (step S201), and determines whether the pair of side plates 18A, 18B have been moved to their respective reference positions PR, PL in the above step S109, S115 or S121 or the positions of the pair of side plates 18A, 18B have been held in step S118, i.e., the pair of side plates 18A, 18B have not been moved (step S202).

For example, when determining that the positions of the pair of side plates 18A, 18B have been held in step S118 ("No" in step S202), the control device 33 acquires the positions of the pair of side plates 18A, 18B by reading them from the storage device 32 because the held positions of the pair of side plates 18A, 18B are stored in the storage device 32, and determines the standard size for recording paper sheets K matching the positions of the pair of side plates 18A, 18B with reference to a size data table previously stored in the storage device 32 (step S203).

For example, the storage device 32 previously stores a size data table DT shown in FIG. 17. The size data table DT contains, for each of various standard sizes, the width and an acceptable width range ±Δx of the standard size. As seen from FIG. 12, the width of the recording paper sheet K is a value obtained by subtracting, from a known distance x0 between the reference positions PR, PL spaced apart from each other, the respective travel distances x1 of the pair of side plates 18A, 18B from their respective reference positions PR, PL to the inner wall surfaces of the pair of side plates 18A, 18B. The control device 33 acquires as the positions of the pair of side plates 18A, 18B the respective travel distances x1 of the pair of side plates 18A, 18B from their respective reference positions PR, PL to the inner wall surfaces of the pair of side plates 18A, 18B by reading them from the storage device 32. The control device 33 subtracts the travel distances x1 from the known distance x0 to calculate the width of the recording paper sheets K. The control device 33 selects, with reference to the size data table DT, the width and acceptable width range ±Δx of a standard size matching the calculated width of recording paper sheets K and determines the standard size associated with the selected width and acceptable width range ±Δx of a standard size.

On the other hand, when determining that the pair of side plates 18A, 18B have been moved to and stopped at their respective reference positions PR, PL in step S109, S115 or S121 ("Yes" in step S202), the control device 33 controls the drive of the stepping motor of the widthwise drive device 22 to move the pair of side plates 18A, 18B from their respective reference positions PR, PL toward each other and determines, based on the detected outputs of the end detecting devices 25A, 25B, that the pair of side plates 18A, 18B have reached the proximity of the recording paper sheets K on the sheet rack 12 (step S204). The control device 33 controls the number, phase and so on of pulses to be applied to the stepping motor of the widthwise drive device 22 to move the pair of side plates 18A, 18B further fixed distances, thus allowing the pair of side plates 18A, 18B to abut both ends of the recording paper sheets K on the sheet rack 12 (step S205).

In doing so, as shown in FIG. 9, the control device 33 may move the pair of side plates 18A, 18B slightly back away from the locations of abutment against both ends of the recording paper sheets K and then return the pair of side plates 18A, 18B to the locations of abutment, thus correcting the deflection, tilt or so on of each recording paper sheet K to align both ends of the recording paper sheets K well.

The control device 33 calculates, based on the number and phase of pulses applied to the stepping motor of the widthwise drive device 22, the respective travel distances x1 from the respective reference positions PR, PL on both sides of the sheet rack 12 to the positions of the pair of side plates 18A, 18B as shown in FIG. 12, and allows the storage device 32 to store the respective travel distances x1 as the respective positions of the pair of side plates 18A, 18B (step S206). The control device 33 subtracts the travel distances x1 from the known distance x0 to calculate the width of the recording paper sheets K, selects, with reference to the size data table DT, the width and acceptable width range ±Δx of a standard size matching the calculated width of the recording paper sheets K, and determines the standard size associated with the selected width and acceptable width range ±Δx of a standard size (step S207).

The control device 33 controls the drive of the stepping motor of the lifting/lowering drive device 13 to move up the sheet rack 12 (step S208) and presses the uppermost recording paper sheet K on the sheet rack 12 against the sheet feed roller 17 (step S209) as shown in FIG. 7.

Based on the size of recording paper sheets K determined in step S203 or S207, the control device 33 sequentially conveys the recording paper sheets K on the sheet rack 12 to the image forming device 8, for example, by intermittently rotating the sheet feed roller 17.

In the general document reading device described previously, it is necessary for the user to manually move the pair of guide plates. Although in the general image forming apparatus described previously the pair of alignment plates are moved by a motor, the image forming apparatus does not include any specific structure for detecting the sheet size.

Unlike the above general techniques, in this embodiment, when the cover 10A of the sheet feeder 10 is opened and a plurality of recording paper sheets K are loaded on the sheet rack 12, the pair of side plates 18A, 18B abut both ends of the recording paper sheets K on the sheet rack 12 based on the detected outputs of the end detecting devices 25A, 25B and, thus, both ends of the recording paper sheets K on the sheet rack 12 are aligned. In addition, the width of the recording paper sheets K is calculated based on the travel distances of the pair of side plates 18A, 18B and a standard size matching the calculated width of the recording paper sheets K is determined. Furthermore, the sheet rack 12 moves up to press the uppermost recording paper sheet K on the sheet rack 12 against the sheet feed roller 17. To sum up, the ends of the recording paper sheets K on the sheet rack 12 are automatically regulated and aligned and the size of the recording paper sheets K is automatically determined.

Although in the above embodiment the multifunction peripheral is shown as an example of the image forming apparatus according to the present disclosure, it is merely illustrative and the image forming apparatus according to the present disclosure may be a copier, a printer, a facsimile machine or other image forming apparatuses.

The structures and configurations of the above embodiment and modifications described with reference to FIGS. 1 to 17 are merely illustrative of the present disclosure and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. A sheet feeder comprising:

a sheet rack;

a pair of side plates movable in a widthwise direction of a sheet loaded on the sheet rack and abuttable against both widthwise ends of the sheet;

a widthwise drive device that moves the pair of side plates in the widthwise direction of the sheet;

a pair of end detecting devices provided one for each of the pair of side plates and capable of detecting both the respective ends of the sheet abutting the pair of side plates, respectively; and a control device that includes a processor, controls the widthwise drive device through the processor executing a control program to allow the widthwise drive device to move, based on detected outputs of the pair of end detecting devices, the pair of side plates until abutment of the pair of side plates against both the ends of the sheet, acquires respective travel distances of the pair of side plates moved by the widthwise drive device, and determines a size of the sheet based on the travel distances of the pair of side plates, wherein the sheet rack includes: a pair of cutaways formed one in each of portions of the sheet rack located under both the ends of the sheet loaded on the sheet rack; and a narrow portion defined between the pair of cutaways, the pair of side plates are movable in the widthwise direction of the sheet within regions of the pair of cutaways, when in absence of any sheet on the sheet rack, the control device controls the widthwise drive device to move the pair of side plates toward each other, and when the pair of side plates abut both ends of the narrow portion based on the detected outputs of the pair of end detecting devices, the control device controls the widthwise drive device to move the pair of side plates away from each other by respective predetermined distances to position the pair of side plates at respective reference positions, and when in presence of the sheet on the sheet rack, the control device controls the widthwise drive device to move the pair of side plates toward each other, and when the pair of side plates abut both the ends of the sheet based on the detected outputs of the pair of end detecting devices, the control device determines the respective travel distances of the pair of side plates moved from the respective reference positions by the widthwise drive device, and determines the size of the sheet based on the travel distances of the pair of side plates.

2. The sheet feeder according to claim 1, further comprising a storage device, wherein the control device allows the storage device to store the respective travel distances of the pair of side plates from the respective reference positions, and when the size of the sheet loaded on the sheet rack is changed, the control device reads the travel distances of the pair of side plates from the storage device; controls the widthwise drive device to move the pair of side plates away from each other by the read travel distances to position the pair of side plates at the respective reference positions; controls the widthwise drive device to move the pair of side plates toward each other; stop, when the pair of side plates abut against both the ends of the sheet based on the detected outputs of the pair of end detecting devices, the pair of side plates at both the ends of the sheet; determines the respective travel distances of the pair of side plates moved by the widthwise drive device; and determines the size of the sheet based on the travel distances of the pair of side plates.

3. The sheet feeder according to claim 2, wherein when the size of the sheet loaded on the sheet rack is held, the control device holds respective positions of the pair of side plates without moving the pair of side plates.

4. The sheet feeder according to claim 1, further comprising a lifting/lowering drive device capable of moving the sheet rack in a height direction, wherein the pair of end detecting devices are provided at respective lower portions of the pair of side plates, and the control device controls the lifting/lowering drive device to move down the sheet rack and bring the sheet rack close to the pair of end detecting devices; controls the widthwise drive device to move the pair of side plates toward each other; stops, when the pair of side plates abut against both the ends of the sheet based on the detected outputs of the pair of end detecting devices, the pair of side plates at both the ends of the sheet; determines the respective travel distances of the pair of side plates moved by the widthwise drive device; and determines the size of the sheet based on the travel distances of the pair of side plates.

5. An image forming apparatus comprising:

the sheet feeder according to claim 1; and an image forming device that forms an image on the sheet fed from the sheet feeder.

* * * * *